United States Patent
Nakamura et al.

(12)

(10) Patent No.: US 6,190,570 B1
(45) Date of Patent: Feb. 20, 2001

(54) METHOD OF REMOVING, COLLECTING, AND TREATING SUBSTANCES FLOATING ON WATER SURFACE AND APPARATUS FOR REMOVING, COLLECTING, AND TREATING THE SUBSTANCES

(75) Inventors: Shinichi Nakamura, Osaka; Kunihiko Fukuzuka, Habikino, both of (JP)

(73) Assignee: Omega Co., Ltd (JP)

( * ) Notice: Under 35 U.S.C. 154(b), the term of this patent shall be extended for 0 days.

(21) Appl. No.: 09/306,862

(22) Filed: May 7, 1999

(30) Foreign Application Priority Data

Sep. 7, 1998 (JP) .................................................. 10-268924

(51) Int. Cl.$^7$ ................................................... E02B 15/04
(52) U.S. Cl. ........................ 210/776; 210/923; 210/242.3; 210/526
(58) Field of Search ..................................... 210/747, 776, 210/783, 156, 160, 170, 242.3, 400, 401, 503, 526, 923

(56) References Cited

U.S. PATENT DOCUMENTS

| | | | |
|---|---|---|---|
| 4,111,801 | * | 9/1978 | Jay et al. .............................. 210/400 |
| 4,165,282 | * | 8/1979 | Bennett et al. ....................... 210/400 |
| 4,480,800 | * | 11/1984 | Oberg et al. .......................... 210/923 |
| 5,080,781 | * | 1/1992 | Evins, IV ............................. 210/170 |
| 5,362,391 | * | 11/1994 | Stephens .................................. 242/55 |
| 5,954,973 | * | 9/1999 | Hobson .............................. 210/242.3 |

* cited by examiner

Primary Examiner—David A. Simmons
Assistant Examiner—Frank M. Lawrence
(74) Attorney, Agent, or Firm—Hayes, Soloway, Hennessey, Grossman & Hage, PC

(57) ABSTRACT

In floating substance removing, collecting and treating method and apparatus capable of securely separating and collecting floating substances floating on a water surface without adversely affecting an ecological system regardless of the type and state of the floating substances, a permeable sheet 4 is successively or intermittently moved through a drive unit 5 so as to traverse the treating water P taken from an intake port 3 and at the same time the treating water P is forcibly moved relatively to the permeable sheet 4. Accordingly, floating substances F on the water surface can be effectively collected by being deposited on and separated from the permeable sheet 4, whereby filtered clean water can be obtained.

11 Claims, 5 Drawing Sheets

(a)

(b)

METHOD OF REMOVING, COLLECTING, AND TREATING SUBSTANCES FLOATING ON WATER SURFACE AND APPARATUS FOR REMOVING, COLLECTING, AND TREATING THE SUBSTANCES

BACKGROUND OF THE INVENTION

1. Field of the Invention

The present invention relates to a method of removing, collecting, and treating floating substances such as oil flowing out to the sea, lakes and marshes, rivers, waterways, and the like as well as a red tide caused by the abnormal increase of plankton in the sea and fresh water and an apparatus for removing, collecting, and treating the floating substances.

2. Description of the Related Art

Conventionally, waste water, which is discharged from kitchens, meat and marine product processing factories, oil manufacturing factories, oil and fat processing factories, repair shops, gas stations, and the like, includes a lot of animal-oil-, vegetable-oil-, and mineral-oil-containing wastes, and animal and vegetable oily materials which are made when various materials are processed.

There have been employed a method of surrounding flowing-out oil and red tide plankton which float on the large water surface of the sea and lakes and extend to a large area by an oil fence and the like and scooping them by a pump or a combined harvester or a method of condensing and settling them after they are diffused by chemical agents.

Although methods similar to the above methods are employed as countermeasures against a red tide, chemical agents for killing plankton are also used, in addition to the above methods. Further, in the Inland Sea of Japan, Lake Biwa and Lake Suwa, the quality of entering water is regulated so that the nitrogen and phosphorus contained in the water is lowered to prevent the overnourishment of the water as a drastic countermeasure for the occurrence of a red tide.

When flowing-out oil and red tide plankton floating on the large water surface of the sea or lakes are collected by a collection ship using the pump or the like, a large amount of water is pumped up at the same time as well as the amount of the collected oil and plankton is only a few percents of the water.

Therefore, since a storage rank of a large capacity, a centrifugal separator, a filtering device and the like must be equipped on the collection ship, there is a problem that the size of the above devices is increased and the cost thereof is increased as well as it is difficult to moor the collection ship at a proper location.

The flowing-out oil on the sea surface is made to aggregates when it is made less fluid in winter, whereas when the red tide plankton increases, dead plankton is also made to aggregates and these aggregates deposit on the bottom of the sea and lakes as a layer. Thus, it is difficult to pump up the aggregates from the bottom.

Although the combined harvester is effective to collect aggregated floating substances, it cannot be used to floating substances having high fluidity. Although there is a method of using the combined harvester in combination with the pump, there is a problem that the apparatus is increased in size and cost. Further, there is also a problem that since the apparatus is not used ordinarily and used only in an emergency, it is difficult to prepare them in a large number as well as when the size of the apparatus is increased, there arises a problem that the collecting ship cannot perform a collection job in a narrow area such as a location near to the seashore.

When the chemical agents are sprayed, it cleans the water surface only temporarily and oil and plankton are diffused in a large area or deposited on the bottom of the sea and lakes and accordingly water becomes polluted in a larger area and adversely affected for a long time. Therefore, there arises a problem that the ecological system of the sea and lakes are seriously affected by the spray of chemical agents.

Next, when the chemical agents are sprayed to kill plankton as a countermeasure against a red tide, the ecological system is seriously affected by them, although the increase of the red tide can be suppressed. Thus, copper sulfate which was used initially is not used now because the toxicity thereof is too high. At present, any chemical agents which are effective without affecting the ecological system have not yet been developed.

SUMMARY OF THE INVENTION

To solve the above problems, an object of the present invention is to provide a method of removing, collecting, and treating floating substances floating on a water surface capable of securely separating and collecting the floating substances without adversely affecting the ecological system regardless of the kinds of the floating substances and the state thereof, and an apparatus for removing, collecting, and treating the floating substances.

A method of removing, collecting and treating floating substances floating on a water surface of the present invention has a feature that it comprises the steps of forcibly moving treating water containing the floating substances relatively to a permeable sheet and causing the treating water to pass through the permeable sheet; depositing the floating substances on the permeable sheet and gathering them; and obtaining treated water having passed through the permeable sheet.

According to the above feature, since the treating water including the floating substances is forcibly moved relatively to the permeable sheet, a flow of water is made to the treating water by the relative movement thereof. Therefore, the treating water can be made to clean treated water in such a manner that the floating substances are deposited and gathered on the permeable sheet and filtered thereby.

In the method of removing, collecting and treating floating substances of the present invention, it is preferable that the permeable sheet is successively or intermittently fed and collected.

With this operation, since the fresh surface of the permeable sheet is fed at all time, the clogging of the permeable sheet can be prevented, whereby the floating substances can be stably removed, collected and processed successively.

In the method of removing, collecting and treating floating substances of the present invention, it is preferable that the permeable sheet is disposed in the vicinity of an intake port in a tensioned state so as to successively or intermittently travel in an obliquely upwardly inclined state, deposits or loads the floating substances in the treating water supplied thereto on it and thereafter is squeezed.

With this operation, since the water contained in the interior of the permeable sheet is removed by the squeeze processing, the weight of the permeable sheet is reduced and the permeable sheet can be easily transported, whereby it can be easily destroyed by fire in the next process.

In the method of removing, collecting and treating floating substances of the present invention, it is preferable that the oily materials contained in the floating materials gathered by the permeable sheet which is folded to two sections by a guide member while being moved are separated to oily materials of high viscosity and oily materials of low viscosity and they are separately collected to the opposite sides of a squeezing member acting as a boundary, respectively.

With this operation, the less fluid oily materials of high viscosity and the more fluid oily materials of low viscosity can be separately collected on both the side of the squeezing member.

A floating substance removing, collecting, and treating apparatus of the present invention has a feature that it comprises a permeable sheet successively or intermittently fed downstream of an intake port through which treating water containing floating substances is taken; and a drive unit for moving the permeable sheet so that it traverses the water surface of the treating water taken from the intake port and collecting the permeable sheet, wherein the treating water is forcibly moved relatively to the permeable sheet so as to pass through the permeable sheet so that treated water is obtained by depositing or loading the floating substances in the treating water on the permeable sheet as well as the floating substances are collected.

According to the feature, since the permeable sheet is moved successively or intermittently by the drive unit so as to traverse the water surface of the treating water taken from the intake port and at the same time the treating water is forcibly moved relatively to the permeable sheet, the floating substances on the water surface can be effectively deposited on the permeable sheet or loaded thereon and separately collected, whereby clean treated water having been filtered can be obtained.

It is preferable that the floating substance removing, collecting, and treating apparatus of the present invention further comprises a guide plate extending outwardly from the intake port to take the treating water containing the floating substances from a wide area by forcibly causing the relative movement to the treating water.

With this arrangement, since the treating water can be relatively and forcibly moved by the guide plate extending outwardly, a red tide and the like widely floating on the water surface can be easily introduced to the intake port.

In the floating substance removing, collecting, and treating apparatus of the present invention, the intake port is opened to a portion of a treatment tank and the permeable sheet is detachably supported in a tensioned state and fed downstream of the intake port in an obliquely upward direction to traverse the water surface of the treating water.

With this arrangement, since the permeable sheet is disposed to the treatment tank in the tensioned state and detachably supported thereby, the permeable sheet can be replaced with a new one at once on the completion of use thereof, whereby a floating substance collecting job can be successively carried out without being interrupted.

In the floating substance removing, collecting, and treating apparatus of the present invention, it is preferable that the permeable sheet is held in the tensioned state with a portion thereof inclined obliquely upward so as to traverse the water surface of the treating water taken from the intake port, travels with the extended portion thereof inclined downwardly and both the sides thereof raised upward by guide members, and is squeezed by squeezing members in the traveling process while being folded to two sections, and the squeezed strip-shaped permeable sheet is wound by a winding member in a tensioned state.

With this arrangement, since both the sides of the permeable sheet are raised by the guide members in a state that the extending portion thereof is downwardly inclined, the fluid floating substances deposited on the permeable sheet are gathered without flowing out. Therefore, the fluid floating substances can be squeezed and collected by being wound together with the permeable sheet in a process that the permeable sheet is squeezed while being folded and wound around the winding member.

In the floating substance removing, collecting, and treating apparatus of the present invention, it is preferable that the winding member of the permeable sheet uses, as the drive source thereof, the rotational power of a screw which is rotated by the movement of the treating water relative to the treatment tank.

With this arrangement, since the power source for driving the winding member for winding the permeable sheet can be obtained by the rotation of the screw which is rotated by the relative movement of the treating water, an energy saving effect can be obtained because electric power, hydraulic pressure and the like are not needed as the power source.

The floating substance removing, collecting, and treating apparatus of the present invention, it is preferable that the treatment tank has a first collecting chamber formed just below the permeable sheet on the left side of the squeeze member as a boundary for accommodating oily materials of low viscosity and a second collecting chamber formed just below the permeable sheet on the right side of the squeeze member for accommodating oily materials of high viscosity.

With this arrangement, the oily materials of high viscosity and the oily materials of low viscosity can be separately accommodated, whereby a collecting job for collecting the oily materials of high viscosity which is difficult to be collected can be effectively carried out.

In the floating substance removing, collecting, and treating apparatus of the present invention, it is preferable that the treatment tank is mounted on a portion of a ship.

With this arrangement, since the treatment tank is mounted on a portion of the ship, the permeable sheet is moved as the ship sails. As a result, the permeable sheet is forcibly moved relatively to the permeable sheet, whereby the floating substances in the treating water can deposited on the permeable sheet and collected in a process that they are filtered through the permeable sheet.

In the floating substance removing, collecting, and treating apparatus of the present invention, it is preferable that the permeable sheet is composed of nonwoven fabric or waterproof converted paper.

With this arrangement, the floating substances in the treating water can be collected when the treating water is caused to pass through the permeable sheet, whereby the strength of the permeable sheet can be maintained even if it is dipped into the treatment tank for a long time.

DESCRIPTION OF THE PREFERRED EMBODIMENTS

Figure 1:
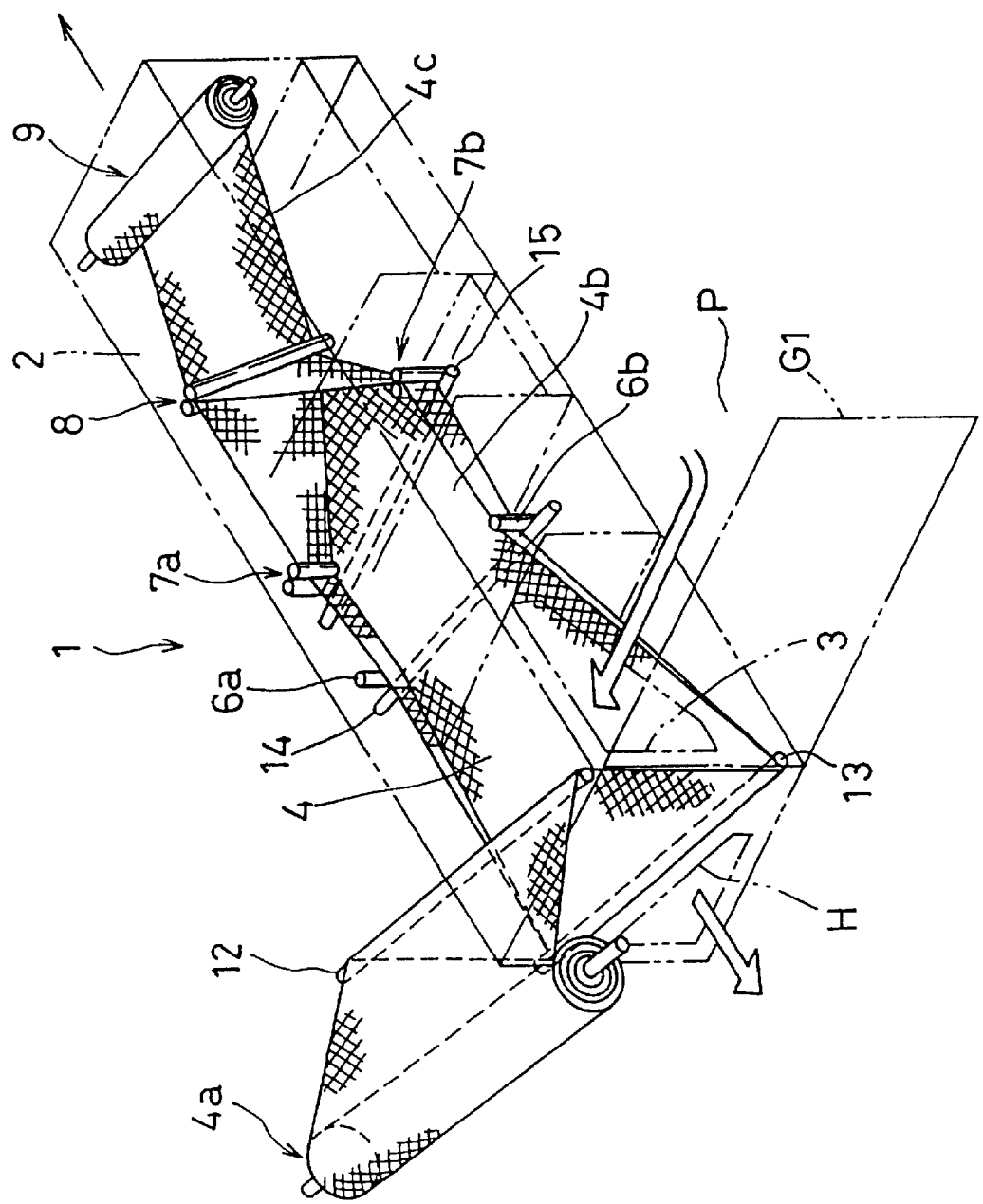
FIG. 1 is an overall perspective view showing a state that a permeable sheet used to a floating substance removing, collecting, and treating apparatus as a first embodiment of the present invention is disposed in a treatment tank.
Figure 2:
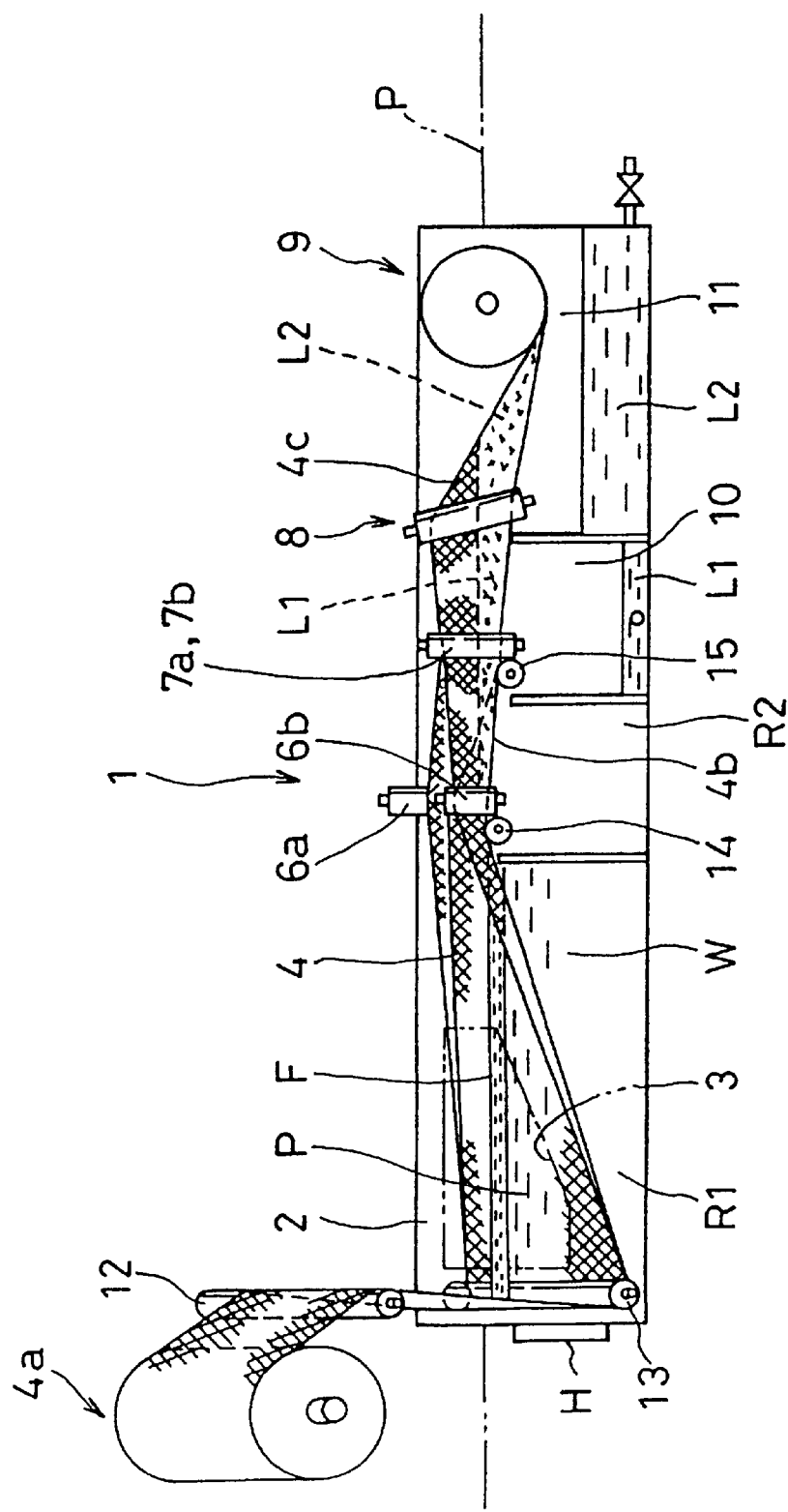
FIG. 2 is a side sectional view showing the floating substance removing, collecting, and treating apparatus as the first embodiment of the present invention in its entirety.

Embodiments of the present invention will be described below with reference to the accompanying drawings. FIG. 1 is an overall perspective view showing a state that a permeable sheet used to a floating substance removing, collecting, and treating apparatus is disposed in a treatment tank and FIG. 2 is a side sectional view showing the floating substance removing, collecting, and treating apparatus in its entirety.

First, a first embodiment of the floating substance removing, collecting, and treating apparatus of the present invention for removing, collecting and treating floating substances floating on a water surface will be described. As shown in FIG. 1 and FIG. 2, numeral 1 denotes the floating substance removing, collecting, and treating apparatus which includes a box-shaped treatment tank 2 for treating seawater and water in lakes and marshes, rivers, waterways, and the like as treating water W containing floating substances F. The treatment tank 2 has an intake port 3 for taking the treating water W into the treatment tank 2. The treatment tank 2 is provided with a drive unit 5 for successively or intermittently feeding a permeable sheet 4 downstream of the intake port 3 of the treatment tank 2 as well as moving the permeable sheet 4 so that it traverses the water surface of the treating water W taken from the intake port 3 and collecting the permeable sheet 4. In the apparatus, the treating water P is forcibly moved with respect to the permeable sheet 4 so that treated water W is obtained by causing the treating water P to pass through the permeable sheet 4 and as well as floating substances F are gathered and collected.

More specifically, the intake port 3 is opened to a portion of the treatment tank 2 the treatment tank 2 has a guide plate G1 projecting from the front end side surface thereof in the direction forward of the intake port 3 at approximately right angles with respect to the intake port 3 in order to introduce the treating water P into the intake port 3.

The permeable sheet 4 is detachably disposed in the treatment tank 2 in a tensioned state and fed downstream of the intake port 3 in such a manner that it is fed obliquely upward to traverse the water surface of the treating water P.

The permeable sheet 4 is held in the tensioned state with a portion thereof inclined obliquely upward so that it traverses the water surface of the treating water P taken from the intake port 3 while being guided by the guide plate G1. The permeable sheet 4 is caused to travel in a state that both the sides thereof are raised by a pair of vertical guide rollers 6a, 6b and two pairs of vertical guide rollers 7a, 7b which serve as guide members with the extending portion 4b thereof inclined downward. In the moving process, the permeable sheet 4 is squeezed by a pair of squeeze rollers 8 as a squeezing member in a state that it is folded to two portions and the squeezed strip-shaped permeable sheet 4b is wound on a winding member 9 in a tensioned state.

The treatment tank 2 has a first collecting chamber 10 formed just below the permeable sheet 4 on the left side of the squeeze rollers 8 as a boundary for accommodating an oily material L1 having low viscosity and a second collecting chamber 11 formed just below the permeable sheet 4 on the right side of the squeeze rollers 8 for accommodating an oily material L2 having high viscosity.

It is preferable that the treatment tank 2 is arranged such that it can be installed on a portion of a not shown ship so as to forcibly move the treating water P containing the floating substances F relatively to the permeable sheet 4. When the treatment tank 2 is used in a river or a waterway where water flows, it is fixedly disposed against the flow of the water.

The floating substances F which float in treating water P are, for example, oil flown out to the sea by tanker accidents and the like, animal-oil-, vegetable-oil-, and mineral-oil-containing wastes included in waste water discharged from kitchens, meat and marine product processing factories, oil manufacturing factories, oil and fat processing factories, repair shops, gas stations, and the like, as well as a red tide caused by the abnormal increase of plankton in the seawater and fresh water.

The permeable sheet 4 used in the floating substance removing, collecting, and treating apparatus 1 is composed nonwoven fabric or waterproof converted paper. More specifically, it is preferable that the permeable sheet 4 is composed of hydrophilic fibers for making paper and pulp, hydrophilic polymer fibers including a hydrophilic group such as polyester, polyvinylalcohol, etc., and hydrophobic polymer fibers such as polypropylene, polyethylene, etc.

Since the permeable sheet 4 is essentially composed of waterproof converted paper such as recycled paper and reinforced by polyethylene fibers, polyester fibers, etc., it can maintain its strength even it is dipped into the treating water P in the treatment tank 2 for a long time. Further, since the permeable sheet 4 has lipophilicity and hydrophilicity in a balanced state, it can particularly collect oily substances and the like floating in the treating water P.

The permeable sheet 4 is arranged as a roll member 4a composed of a strip-shaped nonwoven fabric wound on a rotational shaft. The roll member 4a is rotatably supported by the rotatable shaft at an end of the treatment tank 2 on the upstream side thereof at an inclining angle of, for example, about 45° with respect to the water surface of the treating water P.

The permeable sheet 4 supplied from the roll member 4a is bent by two guide rollers 12, 13 that are supported in parallel with and spaced apart from each other at an inclining angle of about 30° with respect to the water surface of the treating water P. Thereafter, the upper extending portion the permeable sheet 4 is stretched by a guide roller 14 that is supported at an inclining angle of about 15° with respect to the water surface. Since an obliquely ascending surface is formed by the permeable sheet 4 with respect to the bottom of the treatment tank 2 on one end thereof and the intake port 3, the water surface of the treating water P taken from the intake port 3 traverses the obliquely ascending surface of the permeable sheet 4.

According to the floating substance removing, collecting, and treating apparatus arranged as described above, the permeable sheet 4 drawn out from the roll member 4a supported at the one end of the treatment tank 2 in the inclined state is fed to the bottom of the treatment tank 2 in the inclined state and forms the obliquely ascending surface with respect to the intake port 3 as shown in FIG. 1 and FIG. 2.

The extending portion of the permeable sheet 4 to which the obliquely ascending surface is formed is stretched by the guide roller 14 that is supported in the slightly inclined state (about 15° with respect to the water surface). At the same time, the permeable sheet 4 is caused to travel with both the sides thereof raised by the pair of vertical guide rollers 6a, 6b and the two pairs of the vertical guide rollers 7a, 7b. In the moving process, the permeable sheet 4 is folded to the two portions and squeezed by the pair of squeeze rollers 8.

The permeable sheet 4 that is squeezed by the pair of squeeze rollers 8 and made to a flat strip state is wound on the winding member 9 while being stretched.

When, for example, heavy oil and the like are flown out to the sea or a red tide occurs in the sea as the floating substances F, the not shown ship equipped with the floating substance removing, collecting, and treating apparatus 1 sails out to the floating substances F at once to collect them. When the ship arrives at a target area, the treatment tank 2 is floated on the sea in a state that it is mounted on a portion of the right or left side of the ship.

When the ship sails toward the floating substances F floating on a sea surface, seawater flows relatively to the treatment tank 2 so that the permeable sheet 4 in the treatment tank 2 is forcibly moved relatively to the seawater as treating water taken from the intake port 3. As a result, the sea water is filtered through the permeable sheet 4 by the relative movement of the permeable sheet 4 and the movement of it in the longitudinal obliquely ascending surface direction so that the floating substances F floating on the sea surface is adhered to the permeable sheet 4.

Figure 3:
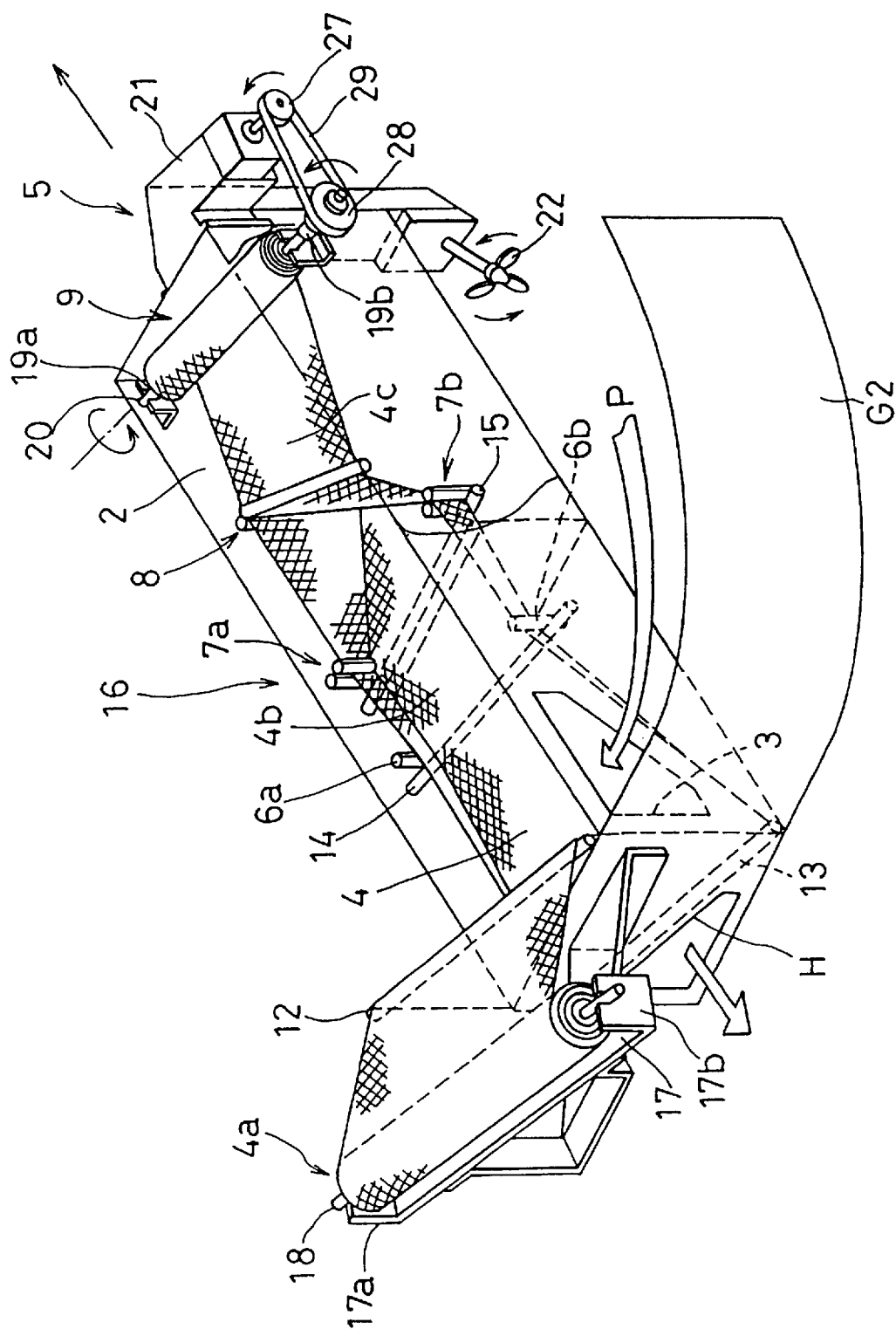
FIG. 3 is a perspective view of the floating substance removing, collecting, and treating apparatus as a second embodiment of the present invention.
Figure 4:
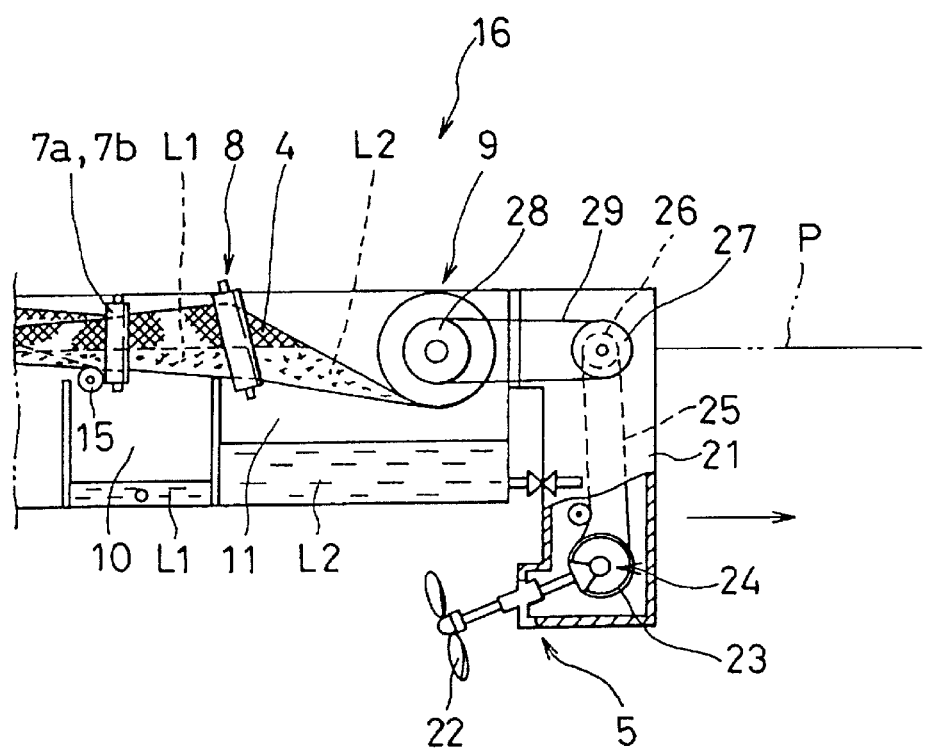
FIG. 4 is a partial sectional view of the floating substance removing, collecting, and treating apparatus as the second embodiment of the present invention.

Next, a second embodiment of the floating substance removing, collecting, and treating apparatus of the present invention will be described. FIG. 3 is a perspective view of the floating substance removing, collecting, and treating apparatus as the second embodiment of the present invention and FIG. 4 is a partial sectional view of the floating substance removing, collecting and treating apparatus. The same components as those used in the first embodiment are denoted by the same numerals and the description thereof is not repeated.

The second embodiment is different from the first embodiment in that a guide plate curved to an arc shape projects toward the intake port of a treatment tank in a state that it further extends externally of the intake port and a winding member for winding a permeable sheet is driven by a screw.

More specifically, numeral 16 denotes a floating substance removing, collecting, and treating apparatus which is arranged such that a roll member 4a on which a strip-shaped nonwoven fabric as a permeable sheet 4 is wound is rotatably supported at an end of a treatment tank 2, a winding member 9 is rotatably supported at the other end of the treatment tank 2. The permeable sheet 4, which is supplied from the roll member 4a into the treatment tank 2, passes therethrough downstream from the intake port 3 of the treatment tank 2 obliquely upward so as to traverse the water surface of treating water and wound on the winding member 9 in a tensioned state.

The roll member 4a of the permeable sheet 4 and the winding member 9 are detachably supported at both the ends of the treatment tank 2. More specifically, the roll member 4a is supported by a bracket 17 that projects from the upper end of the treatment tank 2 at the one end thereof and inclines at an angle of 45° with respect to the water surface of the treating water in such a manner that both the ends of the rotational shaft 18 of the roll member 4a can be removed upward from the cutout grooves formed to the support sections 17a, 17b at both the ends of the bracket 17.

The winding member 9 is rotatably supported by brackets 19a, 19b so that both the ends of the rotational shaft 20 of the winding member 9 can be removed upward from the brackets 19a, 19b likewise the roll member 4a.

Next, a drive unit 5 for rotating the winding member 9 will be described. The drive unit 5 is composed of a water proof case 21 that is mounted on the side of the treatment tank 2 on the other end thereof in correspondence to the winding member 9 supported at the other end of the treatment tank 2 and a screw 22 that is rotatably and obliquely downwardly supported at the lower end of the water proof case 21.

The screw 22 is coupled with a pulley 23 mounted on a horizontal shaft disposed to the lower end of the water proof case 21 through a pair of bevel gears 24. The pulley 23 is coupled with a small pulley 26 disposed at the upper portion of the water proof case 21 through a belt 25.

A large pulley 27 is rotatably supported on the shaft through which the small pulley 26 is supported and a not shown electromagnetic clutch, for example, is interposed between the small pulley 26 and the large pulley 27 and can be electrically connected and disconnected by an external remote operation such as a wireless communication.

A pulley 28 which is engaged with an end of the rotational shaft 20 of the winding member 9 and mechanically connected thereto is connected to the small pulley through a belt 29 so that the winding member 9 can be rotated in the winding direction of the permeable sheet 4 by the rotation of the screw 22 that is rotated by the flow of the seawater relatively to the treatment tank 2.

According to the drive unit 5 for rotating the winding member 9 arranged as described above, since the electromagnetic clutch is disconnected at first by the remote operation, the rotation of the screw 22 is not transmitted to the winding member 9 even if the screw 22 is rotated by the relative flow of the treating water.

When floating substances F approach the treatment tank 2 and the electromagnetic clutch is connected, the rotation of the screw 22 is transmitted to the winding member 9 and the winding member 9 is rotated thereby so that the permeable sheet 4 can be moved in a lengthwise direction at a prescribed proper slow feed speed.

With this operation, an energy saving effect can be obtained because the winding member 9 for winding the permeable sheet 4 can be rotated by the screw 22 that is rotated by the relative movement of the treating water, without the need of electric power, hydraulic pressure and the like as a power source.

On the other hand, the guide plate G2 projects toward the vicinity of the intake port 3 of the treatment tank 2 in the state that it is curved outwardly to draw a large arc from the side of the one end of the treatment tank 2.

With the guide plate G2 arranged as described above, even if the floating substances F floating on the seawater diffuse to a wide range as the case of a red tide, the red tide and the like can be easily introduced into the intake port 3 by relatively and forcibly moving the guide plate G2 extended outwardly.

When the electromagnetic clutch is connected at the time the floating substances F approach the treatment tank 2, the rotation of the screw 22 is transmitted to the winding member 9 so that the winding member 9 is rotated to thereby move the permeable sheet 4 in the lengthwise direction at the prescribed proper slow feed speed.

With this operation, since the power source for winding the permeable sheet 4 on the winding member 9 can be obtained by the screw 22 that is rotated by the relative movement of the treating water, the energy saving effect can be obtained by making the electric power, hydraulic pressure and the like as the power source unnecessary.

Figure 5:
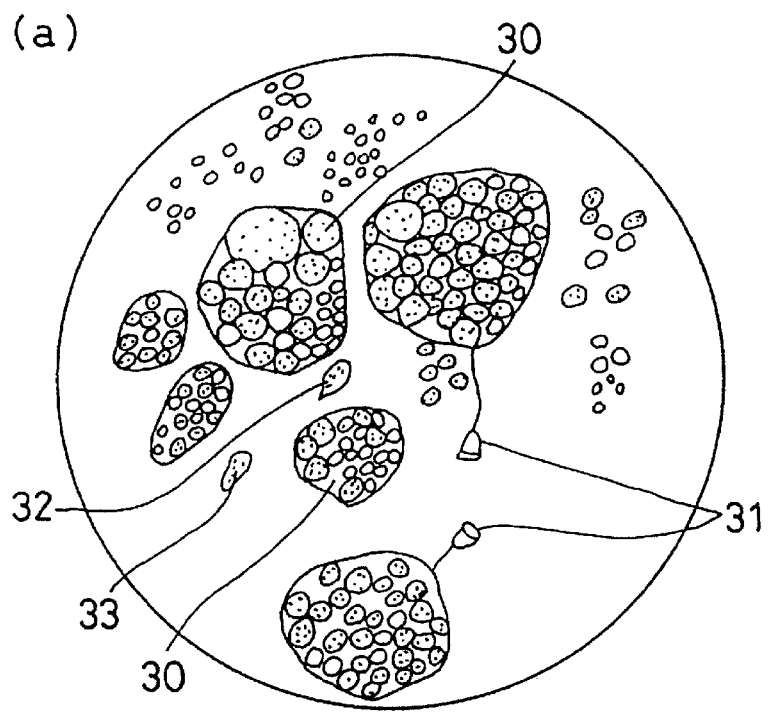
FIG. 5A is an enlarged view of water bloom in original water observed under a microscope and FIG. 5B is a view of treated water filtered through a nonwoven fabric and observed under a microscope.
Figure 5:
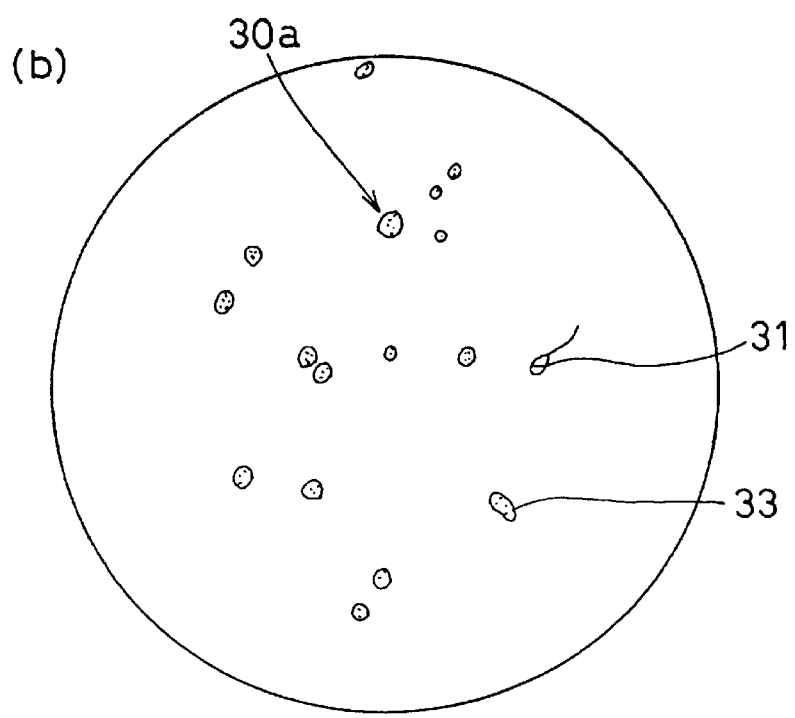

Next, a floating substance removing, collecting, and treating method of the present invention will be described. FIG. 5A is an enlarged view of water bloom in original water observed under a microscope and FIG. 5B is a view of treated water filtered through a nonwoven fabric and observed under a microscope.

In the execution of the floating substance removing, collecting, and treating method, an apparatus that is similar to the floating substance removing, collecting, and treating apparatus 1 of the first embodiment shown in FIG. 1 and FIG. 2 in its outside appearance is employed as an experimental apparatus.

The experimental apparatus is operated on the ground to perform the experiment of the collection of floating substances floating in the water surface of treating water. The experimental apparatus is different from the apparatuses of the above embodiments in that it is not provided with the intake port 3 and the discharge port H.

First, the mixture of heavy oil and water was prepared in a 20 liter polyethylene container in the ratio of 5:95 and dropped onto the treating water P shown in FIG. 1 (onto the permeable sheet 4 in FIG. 2) from just above a tensioned permeable sheet 4 disposed in the experimental apparatus at the position thereof which corresponds to the treating water intake port 3 of the treatment tank 2.

A collecting chamber R1 communicated with a collecting chamber R2 located adjacent thereto. A siphon (not shown) rotatably stood vertically from the discharge port H formed to one end of the treatment tank 2 through an elbow and controlled the amounts of the treating waters which entered the respective collecting chambers R1, R2 and exited therefrom so that the water levels of the waters in the chambers R1, R2 were kept to 10 cm at all times.

A strip-shaped nonwoven fabric sheet Flubel 51208 (trade name of a nonwoven fabric made by Daiki Shoji Co.) of 200 mm wide was used as the permeable sheet 4. The nonwoven fabric sheet was spunbonded and composed of the combination of long fibers and short fibers. The nonwoven fabric had a weight 20 g/m$^2$ and a permeable speed of 12 cc/cm$^2$/min.

Since the permeable sheet 4 located between guide rollers 13, 14 in the collecting chamber R1 had a width of 20 cm and a filtering area of 540 cm$^2$, the permeable speed was 6.5 l/min. However, water was supplied in an amount of 4 l/min taking the effect of heavy oil into consideration and the heavy oil was supplied in an amount of 0.2 l/min.

Thus, the mixture of the heavy oil of 0.2 l/min and water of 4 l/min were supplied onto the treating water P in a mixed state and caused to pass through the permeable sheet 4 stretched in an upwardly inclined state so as to traverse the water surface of the treating water P whose water level was kept to a prescribed level by the inclined discharge siphon. Then, the treated water having been cleaned through the permeable sheet 4 entered the collecting chamber R1 and the water located above the prescribed water level was discharged by a not shown siphon.

When the permeable sheet 4 was pulled up manually by rotating the winding member 9 through a not shown handle, the highly viscous heavy oil floating on the water surface of the treating water P was adhered to the permeable sheet 4 and collected.

On the other hand, when machine oil and turbine oil having low viscosity were used for the test in place of the heavy oil, the collecting efficiency thereof was lowered because these oils only thickly stayed on the water surface of the treating water P in a state that they passed through the permeable sheet 4, although they partly adhered to the permeable sheet 4.

In this case, the inclined discharge siphon was raised to make the water level of the treating water P higher to thereby permit the treating water P to flow onto the permeable sheet 4 between a guide roller 14 and a squeeze rollers 8 beyond the guide roller 14.

Although the water also flowed onto the permeable sheet 4 together with the oils at the time, they flowed into the collecting chamber R2 passing through the permeable sheet 4. Further, since a guide roller 15 was located at a position lower than the guide roller 14, the oils on the permeable sheet 4 having passed the guide roller 14 flowed from a first collecting chamber 10 into a second collecting chamber 11 while the water mixed with the oils passed through the permeable sheet 4.

The oils having the low viscosity passed through the permeable sheet 4 when no water was mixed with them and were accommodated in the first collecting chamber 10.

The permeable sheet 4 was gradually narrowed with both the sides thereof raised by longitudinal guide rollers 6a, 6b and 7a, 7b and formed to a folded strip-shaped bag. At the time, since a pair of squeeze rollers 8 were disposed so as to be adjacent to each other with an interval of 0.2 cm–1 cm, the permeable sheet 4 was squeezed by the squeeze rollers 8.

In the folding operation, the heavy oil having the high viscosity and overflown from the opening side of the permeable sheet 4 was collected into the second collecting chamber 11, the heavy oil having the high viscosity and squeezed when the permeable sheet 4 was wound around the winding member 9 was also collected into the second collecting chamber 11 likewise and a portion of the heavy oil was rolled into to the permeable sheet 4 together with sludge when the permeable sheet 4 was wound.

When the heavy oil having the high viscosity was treated, the permeable sheet 4 could be wound at a winding speed of 2 cm/min; whereas when the turbine oil having the low viscosity was treated, it could be wound at a winding speed of 0.5 cm/min.

The time sequential changes of the oils having respective degrees of viscosity which were treated by the experimental apparatus are summarized as shown in Table 1. Table 1

TABLE 1

| Time Passed | (minutes) | 0~30 | ~60 | ~90 | ~120 |
|---|---|---|---|---|---|
| HEAVY OIL A | | | | | |
| Amount of oil processed | (liter) | 6 | 6 | 6 | 6 |
| Amount of water processed | (liter) | 120 | 120 | 120 | 120 |
| Collected Oil | (liter) | 5.4 | 5.5 | 5.6 | 5.5 |
| Collection Ratio | (%) | 90 | 92 | 93 | 92 |
| Length of wound nonwoven fabric | (cm) | 22 | 18 | 20 | 21 |
| Area | (cm$^2$) | 440 | 360 | 400 | 420 |
| TURBINE OIL | | | | | |
| Collected oil | (liter) | 5.6 | 5.7 | 5.8 | 5.8 |
| Collection ratio | (%) | 93 | 95 | 97 | 97 |
| Length of wound nonwoven fabric | (cm) | 12 | 9 | 10 | 11 |
| Area | (cm$^2$) | 240 | 180 | 200 | 220 |

Next, an experiment executed as to a case that a red tide floated on treating water as floating substances will be described. In the inshore regions of Japan, a red tide appears when the temperature of seawater increases particularly from July to August. The red tide is mainly composed of brown to red algae.

The red tide also appears in Lake Suwa and Lake Biwa and this is caused by water bloom (which are called aoko).

In an experiment of the embodiment, water bloom which floated on a water surface and caused a red tide in fresh water were collected and removed as described below.

Tomatoes were grown in six water growing planters having a capacity of 28 liters in a greenhouse installed on a housetop; when tomatoes were exposed to sunlight by removing lids after they had been grown, water bloom bred on the entire surfaces of the planters in 5 to 6 days and green-layer-like water bloom aggregates floated on a water surface in a thin layer.

The planters had a water depth of 22 cm and water of an amount of about 14 liters, which was about a half the entire amount of the water contained in each of the planters, was sampled from the upper portions of the six planters in the region ranging from the water surface to the depth of 10 cm. Thus, the total amount of the sampled water amounted to 84 liters.

Heat Pack MW4.0 (trade name of a nonwoven fabric made by Nippon Sigyo Co.) was used as a permeable sheet. This nonwoven fabric was a wet type nonwoven fabric sheet made by a paper machine and composed of paper to which polyethylene short fibers were bonded and had a sufficient tensile strength even if it was made wet.

As a preliminary test, when the sampled water was processed with a single nonwoven fabric, many of single cells of water bloom passed through the nonwoven fabric. Thus, the water processed with the nonwoven fabric had chromaticity of 36 and turbidity of 74 in contrast to those of original water of 140 and 269. Further, the water had an outside appearance of light yellowish green and a passing-through speed of 10 cc/min/cm$^2$.

When the water was processed with doubled nonwoven fabrics, not only groups of water bloom but also water bloom of single cells were captured by the nonwoven fabrics and the treated water was made almost transparent and colorless. At the time, the passing-through speed of the water was 9 cc/min/cm$^2$ and was not almost changed. Accordingly, the doubled nonwoven fabrics were used in the experiment.

When the water-bloom-containing water sampled from the planters was supplied onto the permeable sheet 4 above the collecting chamber R1 of the treatment tank 2 shown in FIG. 2, only the water having passed through the obliquely inclined permeable sheet 4 moved to the lower portion of the collecting chamber R1.

When the water level in the treatment tank 2 was set to 20 cm by adjusting the inclining angle of the siphon, the waters in the collecting chambers R1 and R2 were set to the same water level and the water of 16 liters was contained in each of the collecting chambers R1 and R2.

Since the filtering area of the inclined permeable sheet 4 was 540 cm$^2$ likewise the filtering area of the permeable sheet used in the above oil passing-through experiment described above and the passing-through speed of the water-bloom-containing-water was 10 cc/min/cm$^2$ in the preliminary experiment, it was anticipated that the water passed through the permeable sheet 4 at a speed of 5.4 liters/min. Therefore, the water contained in the planter at the upper portion thereof was successively supplied into the 20 liter container by adjusting its cock so that the water passed through the permeable sheet 4 in the amount of 5 liters/min.

The winding member 9 was rotated to supply a fresh filtering surface at all times to prevent the increase of the water level which would be caused when the permeable sheet 4 was clogged in the water filtering processing.

With this operation, the bloom-containing-water (original water) was successively processed for about 20 minutes and water bloom was filtered with the nonwoven fabric MW4.0 as the permeable sheet 4 so that clean and clear water could be obtained.

The effect of the processing could be confirmed by observing the bloom-containing-water (original water) and the treated water under a microscope.

Table 2 shows the result of the collection and removal of the water bloom (microcystis) as a red tide in fresh water with nonwoven fabric. Table 2

TABLE 2

| | Outside Appearance | Chromaticity | Turbidity | Water bloom (single body) cell observed in visual field | Reduction ratio achieved by processing (%) |
|---|---|---|---|---|---|
| Original Water | Containing a large amount of yellowish green and blush green suspended substances; having green laver layer | 140 (100) | 269 (100) | 400 (100) | . . . |
| Processed Water | Clear and slightly light yellow | 27 (19) | 3.6 (1.3) | 15 (3.6) | 96 |

FIG. 5A and FIG. 5B show the states before and after the processing, respectively. These microscopic views are magnified by 100 times wherein the single cell of water bloom has a size of about 0.1–0.2 mm and forms colonies wrapped with an agar-like colloidal material.

After the filter processing, the small colonies 33 of the water bloom having a size of about 0.5–1 mm as well as the colonies 30 thereof having a diameter of 2 mm–2.5 mm are completely removed and the number of single bodies 30a of water bloom, and the number of vorticellae 31, rotifers 32, etc. are also greatly reduced.

It is conceived that this is because of that they are filtered by the nonwoven fabric sheet as the permeable sheet 4 together with the substances such as agar-like glue covering the colonies.

While the embodiments of the present invention have been described above with reference the drawings, the specific arrangements of the invention are by no means limited to the above embodiments and it goes without saying that various improvements and additions made within the range of the gist of the invention are included in the invention.

The present invention will achieve the following advantages.

(a) According to a first aspect of the present invention, since the treating water including the floating substances is forcibly moved relatively to the permeable sheet, a flow of water is made to the treating water by the relative movement thereof. Therefore, the treating water can be made to clean treated water in such a manner that the floating substances are deposited and gathered on the permeable sheet and filtered thereby.

(b) According to a second aspect of the present invention, since the fresh surface of the permeable sheet is fed at all time, the clogging of the permeable sheet can be prevented, whereby the floating substances can be stably removed, collected and processed successively.

(c) According to a third aspect of the present invention, since the water contained in the interior of the permeable sheet is removed by the squeeze processing, the weight of the permeable sheet is reduced and the permeable sheet can be easily transported, whereby it can be easily destroyed by fire in the next process.

(d) According to a fourth aspect of the present invention, the less fluid oily materials of high viscosity and the more fluid oily materials of low viscosity can be separately collected on both the sides of the squeezing member.

(e) According to a fifth aspect of the present invention, since the permeable sheet is moved successively or intermittently by the drive unit so as to traverse the water surface of the treating water taken from the intake port and at the same time the treating water is forcibly moved relatively to the permeable sheet, the floating substances on the water surface can be effectively deposited on the permeable sheet or loaded thereon and separately collected, whereby clean treated water having been filtered can be obtained.

(f) According to a sixth aspect of the present invention, since the treating water can be relatively and forcibly moved by the guide plate extending outwardly, a red tide and the like widely floating on the water surface can be easily introduced to the intake port.

(g) According to a seventh aspect of the present invention, since the permeable sheet is disposed to the treatment tank in the tensioned state and detachably supported thereby, the permeable sheet can be replaced with new one at once on the completion of use thereof, whereby a floating substance collecting job can be successively carried out without being interrupted.

(h) According to an eighth aspect of the present invention, since both the sides of the permeable sheet are raised by the guide members in a state that the extending portion thereof is downwardly inclined, the fluid floating substances deposited on the permeable sheet are gathered without flowing out. Therefore, the fluid floating substances can be squeezed and collected by being wound together with the permeable sheet in a process that the permeable sheet is squeezed while being folded and wound around the winding member.

(i) According to a ninth aspect of the present invention, since the power source for driving the winding member for winding the permeable sheet can be obtained by the rotation of the screw which is rotated by the relative movement of the treating water, an energy saving effect can be obtained because electric power, hydraulic pressure and the like are not needed as the power source.

(j) According to a tenth aspect of the present invention, the oily materials of high viscosity and the oily materials of low viscosity can be separately accommodated, whereby a collecting job for collecting the oily materials of high viscosity which is difficult to be collected can be effectively carried out.

(k) According to an eleventh aspect of the present invention, since the treatment tank is mounted on a portion of the ship, the permeable sheet is moved as the ship sails. As a result, the permeable sheet is forcibly moved relatively to the sea water, whereby the floating substances in the treating water can deposited on the permeable sheet and collected in a process that they are filtered through the permeable sheet.

(l) According to a twelfth aspect of the present invention, the floating substances in the treating water can be collected when the treating water is caused to pass through the permeable sheet, whereby the strength of the permeable sheet can be maintained even if it is dipped into the treatment tank for a long time.

What is claimed is:

1. A method of removing, collecting and processing floating substances floating on a water surface, comprising the steps of:

forcibly moving treating water containing the floating substances relatively to a permeable sheet and causing the treating water to pass through the permeable sheet;

depositing the floating substances on the permeable sheet and gathering them, wherein oily materials contained in the floating materials gathered by the permeable sheet which is folded to two sections by a guide member while being moved are separated into oily materials of high viscosity and oily materials of low viscosity and they are separately collected on the opposite sides of a squeezing member acting as a boundary, respectively; and obtaining treated water having passed through the permeable sheet.

2. A method of removing, collecting and processing floating substances according to claim 1, wherein the permeable sheet is successively or intermittently fed and collected.

3. A method of removing, collecting and processing floating substances according to claim 1, wherein the permeable sheet is disposed in the vicinity of an intake port in a tensioned state so as to successively or intermittently travel in an obliquely upwardly inclined state, deposits or loads the floating substances in the treating water supplied thereto on it and thereafter is squeezed.

4. A method of removing, collecting, and treating apparatus according to claim 1, wherein the permeable sheet is composed of nonwoven fabric or waterproof converted paper.

5. A floating substance removing, collecting, and treating apparatus, comprising:

a permeable sheet successively or intermittently fed downstream of an intake port through which treating water containing floating substances is taken; and a drive unit for moving the permeable sheet so that it traverses the water surface of the treating water taken from the intake port and collecting the permeable sheet, wherein the permeable sheet is held in the tensioned state with a portion thereof inclined obliquely upward so as to traverse the water surface of the treating water taken from the intake port, travels with the extended portion thereof inclined downwardly and both the sides thereof raised upward by guide members, and is squeezed by squeezing members in the traveling process while being folded to two sections, and the squeezed strip-shaped permeable sheet is wound by a winding member in a tensioned state, wherein the treating water is forcibly moved relatively to the permeable sheet so as to pass through the permeable sheet so that treated water is obtained by depositing or loading the floating substances in the treating water on the permeable sheet as well as the floating substances are collected.

6. A floating substance removing, collecting, and treating apparatus according to claim 5, further comprising a guide plate extending outwardly from the intake port to take the treating water containing the floating substances from a wide area by forcibly causing the relative movement to the treating water.

7. A floating substance removing, collecting, and treating apparatus according to claim 5, wherein the intake port is opened to a portion of a treatment tank and the permeable sheet is detachably supported in a tensioned state and fed downstream of the intake port in an obliquely upward direction to traverse the water surface of the treating water.

8. A floating substance removing, collecting, and treating apparatus according to claim 5, wherein the winding member of the permeable sheet uses, as the drive source thereof, the rotational power of a screw which is rotated by the movement of the treating water relative to the treatment tank.

9. A floating substance removing, collecting, and treating apparatus according to claim 7, wherein the treatment tank has a first collecting chamber formed just below the permeable sheet on the left side of the squeeze member as a boundary for accommodating oily materials of low viscosity and a second collecting chamber formed just below the permeable sheet on the right side of the squeeze member for accommodating oily materials of high viscosity.

10. A floating substance removing, collecting, and treating apparatus according to claim 7, wherein the treatment tank is mounted on a portion of a ship.

11. A floating substance removing, collecting, and treatment apparatus according to claim 5, wherein the permeable sheet is composed of nonwoven fabric or waterproof converted paper.

* * * * *